US012721269B2

(12) United States Patent
Missotten et al.

(10) Patent No.: US 12,721,269 B2
(45) Date of Patent: Sep. 1, 2026

(54) HEADER AUTOMATION SYSTEM UTILIZING FRONT FEEDER DRUM POSITION VARIATION OVER TIME

(71) Applicant: CNH Industrial America LLC, New Holland, PA (US)

(72) Inventors: Bart M.A. Missotten, Herent (BE); Bert Marnix Vandewalle, Tornout (BE); Lucas Geert Deruyter, Gits (BE); Dre Waltherus Joachim Jongmans, Klundert (NL); Cory Douglas Hunt, Millersville, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 421 days.

(21) Appl. No.: 18/479,447

(22) Filed: Oct. 2, 2023

(65) Prior Publication Data

US 2024/0122114 A1 Apr. 18, 2024

Related U.S. Application Data

(60) Provisional application No. 63/416,031, filed on Oct. 14, 2022.

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC ................ A01D 41/141; A01D 41/127; A01D 41/1271; A01D 61/008
See application file for complete search history.

(56) References Cited

U.S. PATENT DOCUMENTS

| | | | | |
|---|---|---|---|---|
| 6,213,870 | B1 * | 4/2001 | Satzler | A01F 7/062 460/7 |
| 6,834,484 | B2 | 12/2004 | Coers et al. | |
| 6,951,514 | B1 * | 10/2005 | Coers | A01D 41/127 460/1 |
| 9,807,933 | B2 * | 11/2017 | Boyd | A01D 41/127 |
| 10,321,628 | B2 * | 6/2019 | Borry | A01D 47/00 |
| 11,596,102 | B2 | 3/2023 | Neitemeier et al. | |

(Continued)

FOREIGN PATENT DOCUMENTS

| | | |
|---|---|---|
| EP | 2681984 | 1/2014 |
| EP | 3132665 | 2/2017 |

(Continued)

OTHER PUBLICATIONS

Extended European Search Report for EP Application 23203627.7 dated Mar. 14, 2024 (five pages).

*Primary Examiner* — Mussa A Shaawat
(74) *Attorney, Agent, or Firm* — Fletcher Yoder, P.C.

(57) ABSTRACT

A system and method for automatically adjusting one or more parameters of a header of an agricultural harvester for gathering a crop and feeding the crop into a feeder housing includes receiving, from one or more sensors, a signal indicative of a position of a conveyor idler of a conveyor of the feeder housing over time. The system and method also includes providing one or more control signals to adjust the one or more parameters of the header based on variation of the position of the conveyor idler over time.

20 Claims, 5 Drawing Sheets

(56) References Cited

U.S. PATENT DOCUMENTS

| | | | | |
|---|---|---|---|---|
| 11,895,950 | B2 | 2/2024 | Baumgarten et al. | |
| 2017/0049057 | A1* | 2/2017 | Reinecke | A01F 12/448 |
| 2017/0064904 | A1* | 3/2017 | Figgins | A01D 41/141 |
| 2019/0059223 | A1* | 2/2019 | Seiders, Jr. | A01B 63/008 |
| 2019/0335662 | A1* | 11/2019 | Good | A01D 69/03 |
| 2019/0357437 | A1* | 11/2019 | Neela | A01D 61/008 |
| 2020/0077584 | A1* | 3/2020 | Miller | A01D 41/145 |
| 2020/0375106 | A1* | 12/2020 | Seiders, Jr. | A01D 41/145 |
| 2020/0390037 | A1* | 12/2020 | Keller | A01D 61/00 |
| 2021/0015040 | A1* | 1/2021 | Neitemeier | A01D 61/008 |
| 2021/0100155 | A1* | 4/2021 | Vandeven | A01D 47/00 |
| 2021/0237982 | A1* | 8/2021 | Trowbridge | B65G 43/08 |
| 2021/0289703 | A1* | 9/2021 | Hunt | A01D 41/145 |
| 2024/0407286 | A1* | 12/2024 | Bird | A01D 34/006 |

FOREIGN PATENT DOCUMENTS

| | | | |
|---|---|---|---|
| EP | 3766329 | A1 | 1/2021 |
| EP | 3858129 | A1 | 8/2021 |
| GB | 2107562 | | 5/1983 |
| WO | 2022060731 | A1 | 3/2022 |

* cited by examiner

HEADER AUTOMATION SYSTEM UTILIZING FRONT FEEDER DRUM POSITION VARIATION OVER TIME

CROSS-REFERENCE TO RELATED APPLICATION

This application claims priority to and the benefit of U.S. Provisional Application No. 63/416,031, entitled "HEADER AUTOMATION SYSTEM UTILIZING FRONT FEEDER DRUM POSITION VARIATION OVER TIME," filed Oct. 14, 2022, which is hereby incorporated by reference in its entirety.

BACKGROUND

The present disclosure relates generally to a system for automatically adjusting one or more parameters of a header of an agricultural harvester utilizing front feeder drum position variation over time.

A harvester may be used to harvest crops, such as barley, beans, beets, carrots, corn, cotton, flax, oats, potatoes, rye, soybeans, wheat, or other plant crops. The harvester may include or be coupled to a header, which may be designed to efficiently harvest certain types of crops. For example, a corn header may be designed to efficiently harvest corn. In particular, the corn header may include row units that include components that operate to separate ears of corn from stalks as the harvester travel through a field. Conveyors (e.g., augers) carry the ears of corn toward processing machinery and/or storage compartments of the harvester, while the stalks are deposited back into the field.

A number of factors (e.g., settings or parameters of the header, crop type/condition, forward speed of the harvester, etc.) may impact the header and its feeding of a crop into the harvester. Thus, the header has a large impact on the harvester's efficiency and capacity. The harvester works optimally when the crop flow from the header into a feeder is as smooth as possible with minimal variation in throughput and layer thickness.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural harvester is provided. The agricultural harvester includes a header for gathering a crop and feeding the crop into a feeder housing. The agricultural harvester also includes the feeder housing. The feeder housing includes a conveyor. The conveyor includes a conveyor idler. The agricultural harvester further includes a system for automatically adjusting one or more parameters of the header. The system includes one or more sensors configured to detect a position of the conveyor idler over time. The system also includes a controller configured to receive a signal indicative of the position of the conveyor idler and to provide one or more control signals to adjust the one or more parameters of the header based on variation of the position of the conveyor idler over time.

In certain embodiments, a system for automatically adjusting one or more parameters of a header of an agricultural harvester for gathering a crop and feeding the crop into a feeder housing is provided. The system includes one or more sensors configured to detect a position of a conveyor idler of a conveyor of the feeder housing over time. The system also includes a controller configured to receive a signal indicative of the position of the conveyor idler and to provide one or more control signals to adjust the one or more parameters of the header based on variation of the position of the conveyor idler over time.

In certain embodiments, a method for automatically adjusting one or more parameters of a header of an agricultural harvester for gathering a crop and feeding the crop into a feeder housing. The method includes receiving, at a processor from one or more sensors, a signal indicative of a position of a conveyor idler of a conveyor of the feeder housing over time. The method also includes providing, via the processor, one or more control signals to adjust the one or more parameters of the header based on variation of the position of the conveyor idler over time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
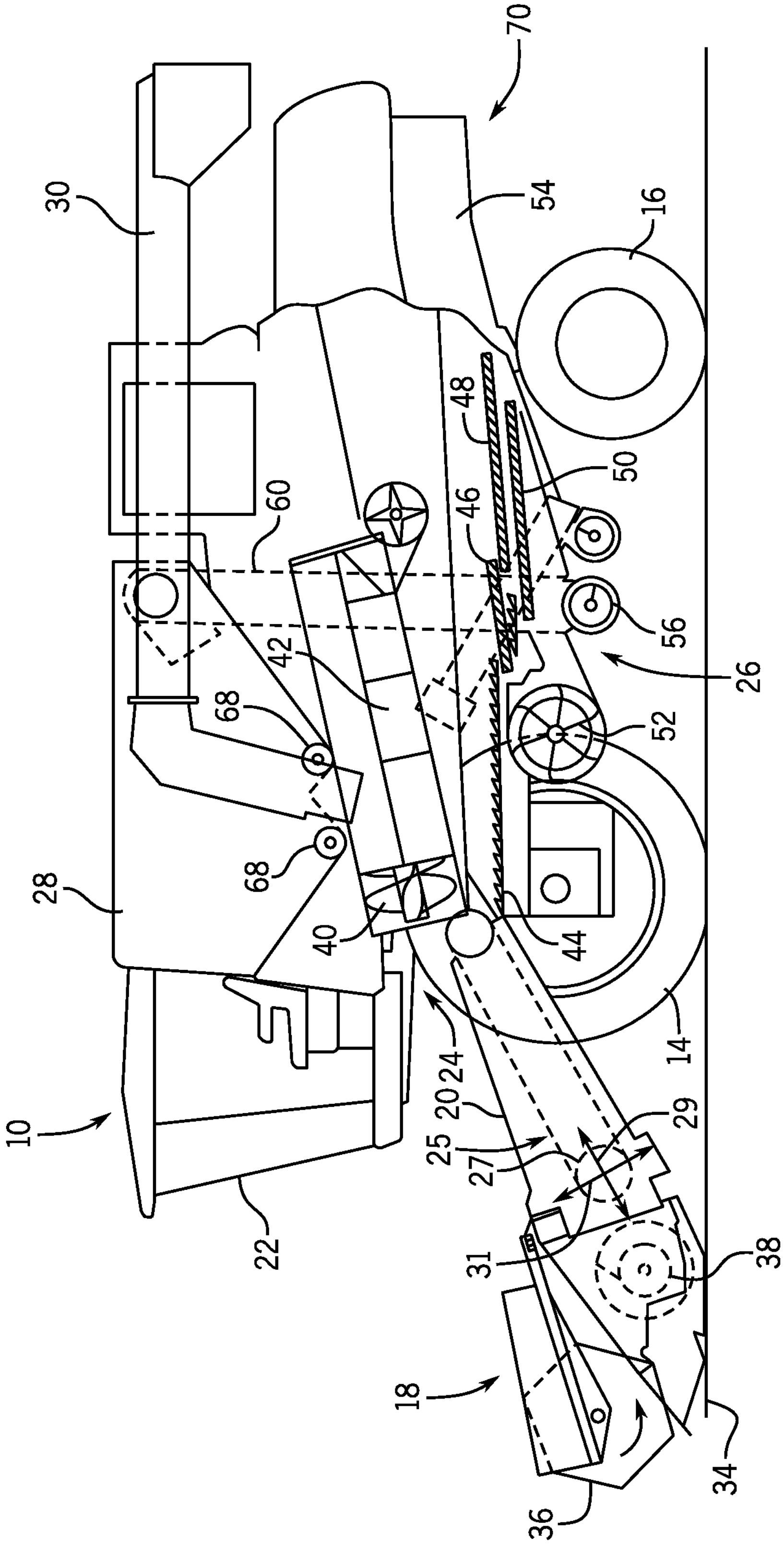
FIG. 1 is a side view of an agricultural harvester in the form of a combine, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "backward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

The present disclosure is generally directed to a system (e.g., header automation system) for automatically adjusting one or more parameters (e.g., knife position, reel position, auger speed, and/or belt speeds of a draper) of a header of an agricultural harvester for gathering a crop and feeding the crop into a feeder housing. The system includes one or more sensors (e.g., linear encoder, laser, etc.) configured to detect a position of a conveyance idler (e.g., front feeder drum directly behind the header) of a conveyor of the feeder housing over time. The system also includes a controller configured to receive (e.g., continuously) a signal indicative of the position of the conveyor idler and to provide one or more control signals to adjust the one or more parameters of the header based on variation of the position of the conveyor idler over time. In certain embodiments, the variation of the position relates to movement of the conveyor idler in a direction parallel to a longitudinal axis of the conveyer. In certain embodiments, the position may be determined on both sides (i.e., longitudinal ends) of the conveyor idler to detect differences in feeding across a width of the conveyor. The controller is configured to bandpass filter the signal at a frequency that a plurality of slats disposed on a plurality of chains of the conveyor pass a detection location of the one or more sensors to generate a filtered signal. The controller is configured to provide the one or more control signals to adjust the one or more parameters of the header based on variation over time of the filtered signal. The controller is configured to adjust the one or more parameters of the header until the variation is minimized. The disclosed system automatically optimizes crop flow from the header into the feeder housing to keep the flow as smooth as possible with minimal variation (e.g., feeding variation) in throughput and layer thickness and, thus, ensures that the agricultural harvester operates efficiently and at capacity.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyance 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24 via a conveyor 25, and is selectively vertically movable using appropriate actuators, such as hydraulic cylinders (not shown). As discussed in greater detail below, the combine 10 includes a system (e.g., header automation system) for automatically adjusting one or more parameters (e.g., knife position, reel position, auger speed, and/or belt speeds of a draper) of the header 18 based on a variation of a detected position of a conveyor idler 27 (e.g., front feeder drum directly behind the header 18) of the conveyor 25 over time (e.g., movement of the conveyor idler 27 in a direction 29 (e.g., horizontal direction) parallel to a longitudinal axis of the conveyor 25 or a direction 31 (e.g., vertical direction) perpendicular to the longitudinal axis of the conveyor 25). In certain embodiments, the conveyor idler 27 may be located toward a rear of the conveyor 25.

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present subject matter with other conventional threshing systems.

Grain which has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
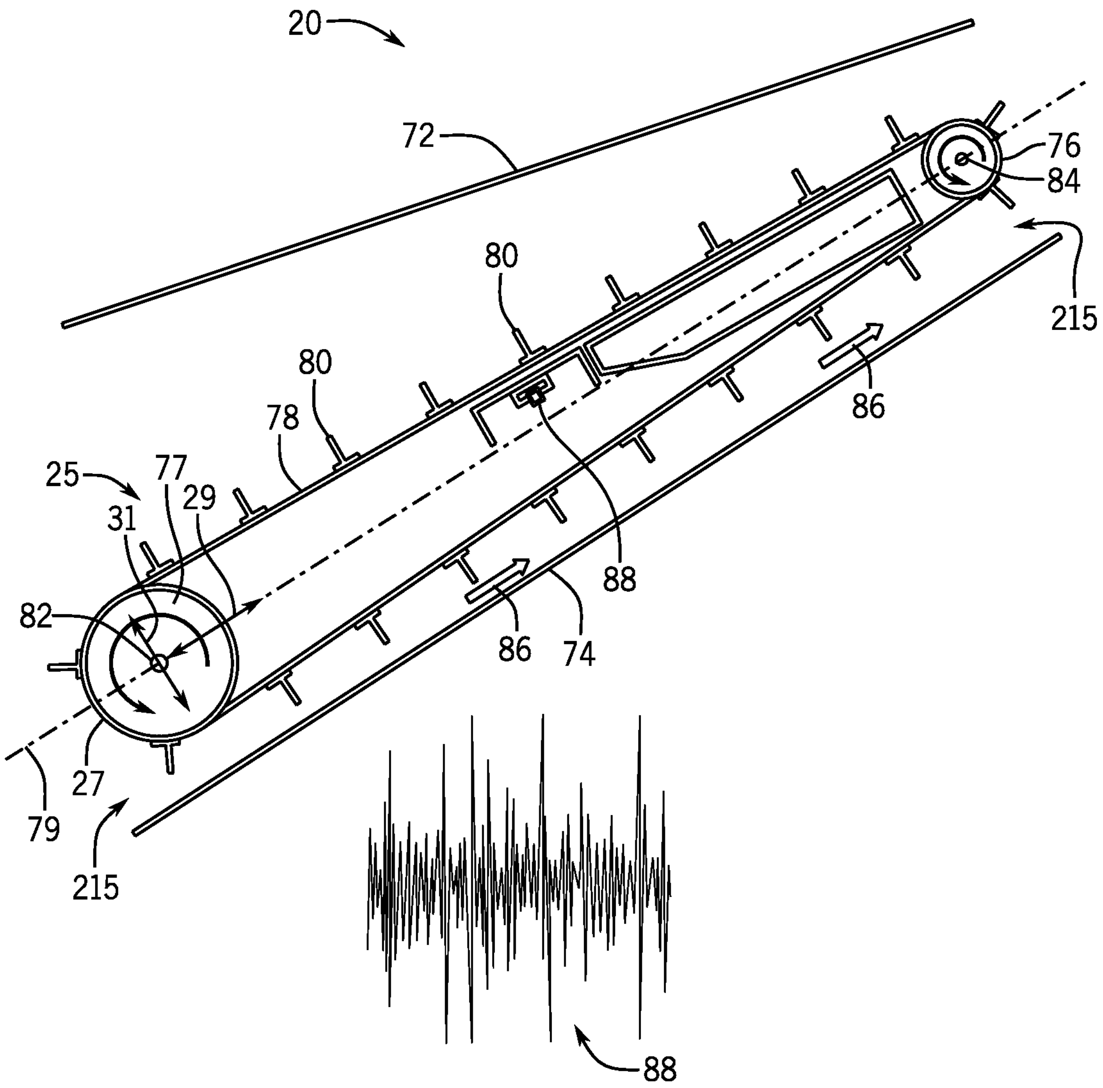
FIG. 2 is a side view of a conveyor disposed within a feeder housing of the agricultural harvester of FIG. 1, in accordance with aspects of the present disclosure.

FIG. 2 is a side view of the conveyor 25 (e.g., inclined chain conveyor) disposed within the feeder housing 20 of the agricultural harvester (e.g., combine 10) of FIG. 1. The feeder housing 20 includes a top wall 72, a bottom wall 74 (opposite the top wall 72), and side walls (not shown) that are disposed about the conveyor 25. As depicted, the conveyor 25 is configured to convey the harvested crop upwardly and rearwardly into the combine 10. The conveyor 25 includes the conveyor idler 27 (e.g., front feeder drum) and a rear drive 76 (e.g., sprocket or drum). In certain embodiments, the conveyor idler 27 is located toward the rear of conveyor 25 and the rear drive 76 is located toward the front of the conveyor 25. In certain embodiments, conveyor idler 27 may be sprockets, pulleys, or sheaves, or only a wear strip. The conveyor idler 27 is mounted movably to the conveyor 25 and provides tension to the conveyor 25. The conveyor idler 27 includes longitudinal ends 77 opposite each other and disposed adjacent opposite side walls of the feeder housing 20. A plurality of chains 78 (e.g., 2, 3, or more chains 78) are disposed about the conveyor idler 27 and the rear drive 76. In certain embodiments, one or more belts may be disposed about the conveyor idler 27 and the rear drive 76 instead of chains 78. The plurality of chains 78 are longitudinally arranged about the conveyor idler 27 and the rear drive 76 along a longitudinal axis 79 of the conveyor 25 extending between the conveyor idler 27 and the rear drive 76. The conveyor 25 includes a plurality of slats 80. Each slat 80 extends transversely across at least two chains 78. In certain embodiments, the slats 80 may extend across belts instead of chains 78. Together the chains 78, slats 80, the conveyor idler 27, and the rear drive 76 act as a chain conveyor. The conveyor idler 27 and the rear drive 76 rotate about respective axes 82 and 84 to drive rotation of the chains 78 and the slats 80 to convey the harvested crop between a bottom portion of the conveyor 25 and the bottom wall 74 of the feeder housing 20 toward the combine 10 as indicated by arrows 86. The conveyor idler 27 may float or move over the crop in the direction 29 (e.g., horizontal direction) parallel to the longitudinal axis 79 and/or the direction 31 (e.g., vertical direction) perpendicular to the longitudinal axis 79. As described in greater detail below, a system may include one or more sensors to measure a position or movement of the conveyor idler 27. The position (e.g., in the direction 29) may be filtered (e.g., bandpass filtered) at a frequency of the slats 80 on the chains 78 passing a detection location of the one or more sensors to generate a filtered signal 88. In certain embodiments, the frequency of the slats may be 9.5 Hertz (Hz). In certain embodiments, a crop frequency may range from 0.2 to 1 Hz. Looking for the power at the crop frequency may enable identification of the crop. An amplitude variation over time of the signal 88 provides a good measure of smoothness or unevenness of feeding the crop into the combine 10. In certain embodiments, one or more additional sensors 89 (e.g., utilizing photoelectric sensing, machine vision sensing, piezoelectric sensing, acoustic sensing, and/or another sensing technology) may be disposed within the conveyor 25 to detect or measure a distribution of the crop across a width of the conveyor 25.

Figure 3:
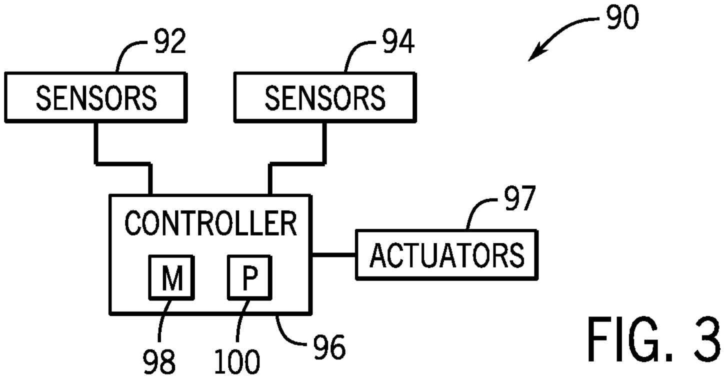
FIG. 3 is a system for automatically adjusting one or more parameters of a header of an agricultural harvester for gathering a crop and feeding the crop into a feeder housing, in accordance with aspects of the present disclosure.
Figure 4:
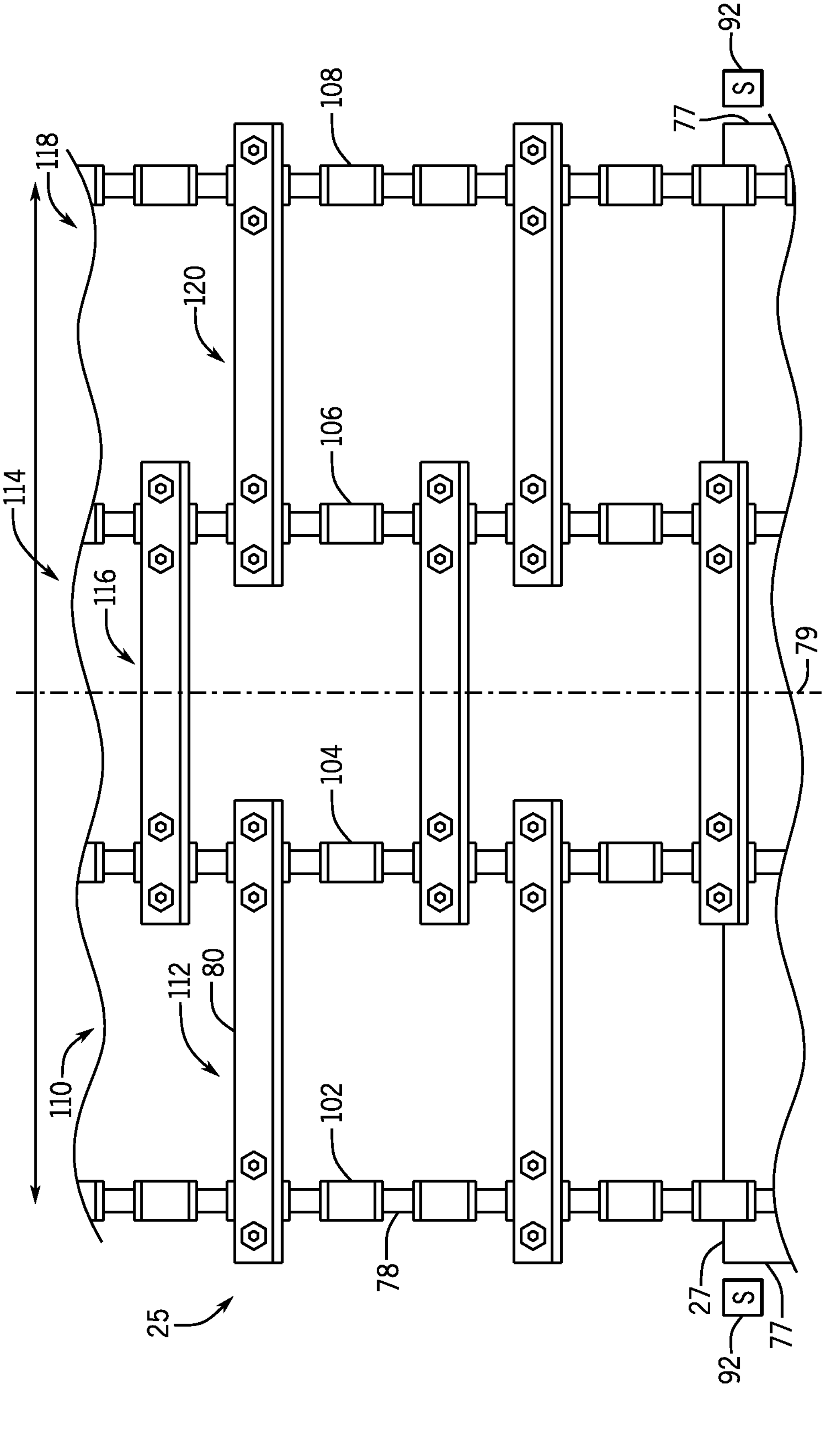
FIG. 4 is top view of a portion of a conveyor illustrating a feeder chain slat pattern, in accordance with aspects of the present disclosure.

FIG. 3 is a system 90 for automatically adjusting one or more parameters of a header of an agricultural harvester for gathering a crop and feeding the crop into a feeder housing. The system 90 includes sensors 92 (e.g., disposed on the combine adjacent to or within the feeder housing) for detecting a position (and thus movement) of the conveyor idler over time. The sensors 92 may be a linear encoder, a laser-based sensor, or some other sensor. In certain embodiments, respective sensors 92 may be disposed on opposite sides of the conveyor to detect respective positions of the conveyor idler on each longitudinal end (e.g., longitudinal ends 77 in FIG. 2) (e.g., as depicted in FIG. 4). Detecting the position of the conveyor idler on each longitudinal end enables the detection of any tilt of the conveyor idler across a width of the conveyor idler. A variation in the detected position of the conveyor idler is utilized to adjust one or more parameters of the header.

The system 90 also includes one or more additional sensors 94 for measuring other parameters or data that may be utilized in combination with the variation in the position of the conveyor idler to adjust the one or more parameters of the header. For example, the one or more additional sensors 94 may be utilized to determine a net engine load (i.e., engine load minus power for driving) of the harvester. The net engine load is the load due to crop processing only. The one or more additional sensors 94 may also be utilized for determining crop height, crop density, and/or humidity before or while the crop is being cut. The one or more additional sensors 94 (e.g., sensors 89) may be utilized for detecting a distribution of the crop across a width of the conveyor.

The sensors 92, 94 are communicatively coupled to and provide feedback (e.g., signals) to a controller 96. The controller 96 is also communicatively coupled to actuators 97 for altering or tuning parameters of the header based on control signals from the controller 96. The parameters (of which the actuators 97 may affect) may include knife position, reel position, auger speed, and/or belt speeds of a draper. The controller 96 is configured to receive (e.g., continuously) the detected position of the conveyor idler (e.g., from the sensors 92). In a preferred embodiment, the detected position of the conveyor idler in the direction 29 depicted in FIGS. 1 and 2. In certain embodiments, the detected position of the conveyor idler in the direction 31 as depicted in FIGS. 1 and 2. In certain embodiments, the controller 96 is configured to receive (e.g., continuously) the respective detected positions of the conveyor idler at each longitudinal end (e.g., from the sensors). The controller 96 is configured to provide one or more control signals (e.g., to the actuators 97) to adjust one or more parameters of the header based on variation of the position (or both respective positions at the longitudinal ends) of the conveyor idler over time. In particular, the controller 96 is configured to filter the signal(s) received (of the detected position(s)) of the conveyor idler by applying a bandpass filter at a frequency of the slats on the chains of the conveyor passing a detection location of the sensors 92 to generate a filtered signal (or a filtered signal for each longitudinal end of the conveyor idler). In certain embodiments, the frequency of the slats may be 9.5 Hertz (Hz). In certain embodiments, a crop frequency may range from 0.2 to 1 Hz. Looking for the power at the crop frequency may enable identification of the crop by the controller 96. The controller 96 is configured to calculate a variation in an amplitude of the filtered signal(s) over time from which the controller 96 is configured to provide the control signals to adjust or tune the one or more parameters of the header. In certain embodiments, the variation in amplitude of the filtered signal may be differentiated over a width of the conveyor due to differences in spacing of the slats on the belts in different sections (e.g., the left section versus the middle section and/or the right section). The controller 96 is also configured to monitor the adjustments and to adjust the one or more parameters until the variation (in the amplitude of the filtered signal) is minimized. In certain embodiments, the controller 96 is configured to adjust the one or more parameters differently for different sides (e.g., left and right sides) of the header.

In certain embodiments, the controller 96 is configured to receive an additional signal indicative of the net engine load (e.g., from the sensor 94), to calculate a recursive correlation between variation of the net engine load over time and the variation of the position of the conveyor idler over time, and to adjust one or more parameters of the header and a ground speed of the harvester based on the recursive correlation. In certain embodiments, the controller 96 is configured to receive one or more additional signals indicative of a distribution of the crop across a width of the conveyor, and to adjust the one or more parameters of the header based on the variation of the position of the conveyor idler over time and the one or more additional signals. In certain embodiments, the controller 96 is configured to receive additional data (e.g., signals from the sensors 94), where the additional data is a crop height, crop density, and/or humidity prior to cutting or while cutting the crop. The controller 96 is configured to adjust the one or more parameters of the header based on the variation of the position of the conveyor idler over time and the additional data.

The controller 96 may include a memory 98 and a processor 100. In some embodiments, the processor 100 may include one or more general purpose processors, one or more application specific integrated circuits, one or more field programmable gate arrays, or the like. Additionally, the memory 98 may be any tangible, non-transitory, computer readable medium that is capable of storing instructions executable by the processor 100 and/or data that may be processed by the processor 100. In other words, the memory 98 may include volatile memory, such as random access memory, or non-volatile memory, such as hard disk drives, read only memory, optical disks, flash memory, and the like.

FIG. 4 is top view of a portion of the conveyor 25 illustrating a feeder chain slat pattern. The conveyor 25 includes the plurality of chains 78 (e.g., chain 102, 104, 106, and 108) disposed about the conveyor idler 27 (e.g., front feeder drum). The plurality of slats 80 are disposed about the chains 78 so that each slat 80 transversely extends across at least two chains 78. In a first section 110 (e.g., right section adjacent a right side wall of the feeder housing), a first set 112 of slats 80 extends across the chains 102, 104. In a second section 114 (e.g., middle section), a second set 116 of slats 80 extends across the chains 104, 106. In a third section 118 (e.g., left section adjacent a left side wall of the feeder housing), a third set 120 of slats 80 extends across the chains 104, 106. A first spacing (e.g., axial spacing) of the first set 112 of slats 80 along the longitudinal axis 79 differs from a second spacing (e.g., axial spacing) of the second set 116 of slats 80 along the longitudinal axis 79. A third spacing (e.g., axial spacing) of the third set 120 of slats 80 along the longitudinal axis differs from the second spacing of the second set 116 of slats 80. As depicted, the first spacing of the first set 112 of slats 80 and the third spacing of the third set 112 of slats 80 are the same. In certain embodiments, the first set 112 of slats 80 and the third spacing of the third set 112 of slats 80 may differ. In certain embodiments, the spacing of each set 112, 116, 120 of slats 80 may vary from each other. The variation in amplitude of the filtered signal (of the detected position of the conveyor idler 27) may be differentiated over a width 122 of the conveyor 25 due to differences in spacing of the slats 80 on the chains 78 in the different sections 110, 114, 118. In particular, having different slat spacing for each section 110, 114, 118 enables the utilization of multiple filter options. Therefor an increase in crop in a specific section would result in a greater increase in variation of the signal when filtered based on slat frequency from that specific section as compared to the signal when filtered based on another section.

Figure 5:
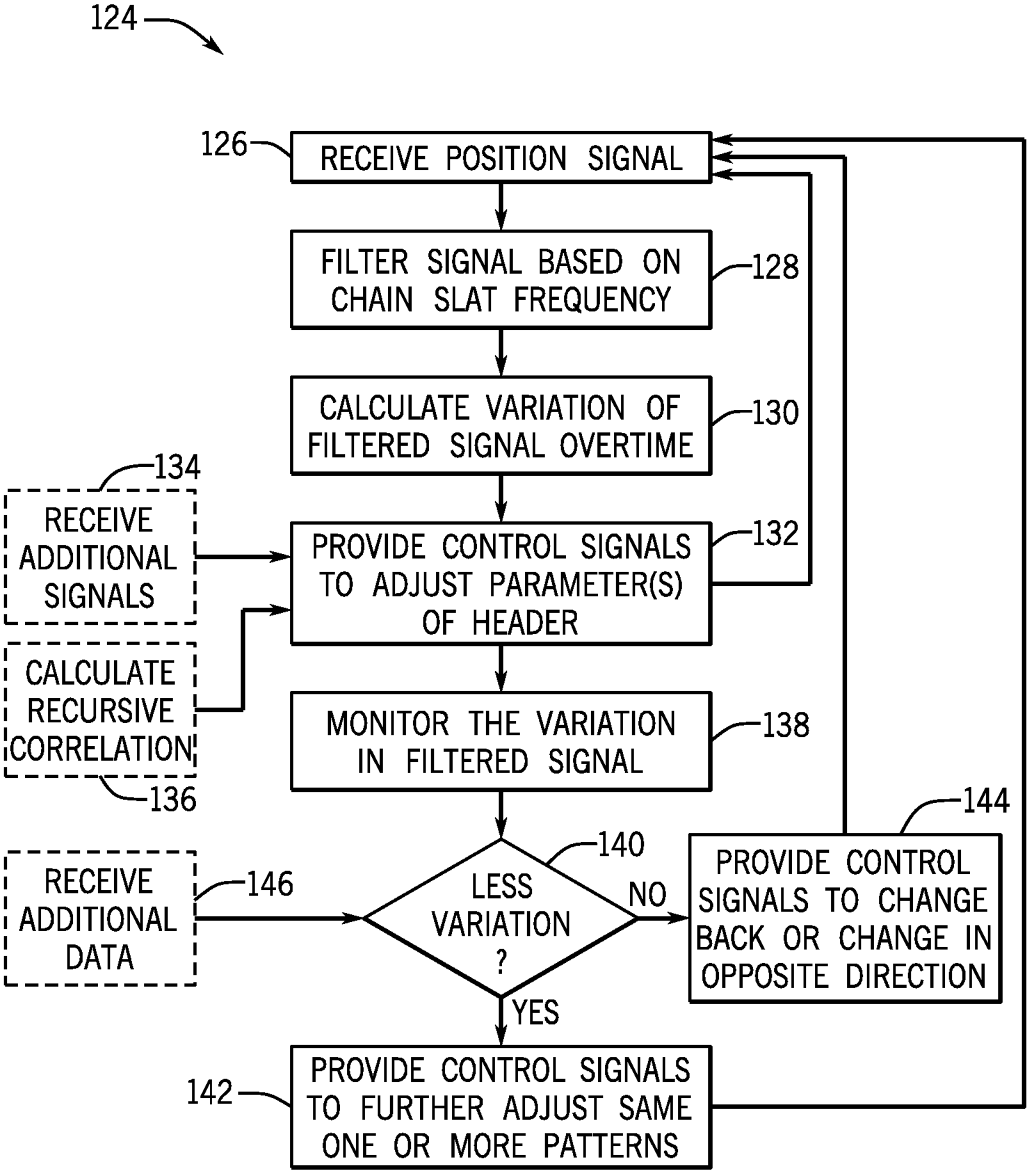
FIG. 5 is a flow chart of a method for adjusting one or more parameters of a header of an agricultural harvester for gathering a crop and feeding the crop into a feeder housing, in accordance with aspects of the present disclosure.

FIG. 5 is a flow chart of a method 124 for adjusting one or more parameters of a header of an agricultural harvester for gathering a crop and feeding the crop into a feeder housing. The steps of the method 124 may be performed by the controller 96 in FIG. 3. One or more of the steps in the method 124 may be performed simultaneously or in a different order from that depicted in FIG. 5.

The method 124 includes receiving (e.g., continuously) a signal (e.g., from the sensors 92 in FIG. 3) indicative of a position of the conveyor idler of a conveyor over time (block 126). In a preferred embodiment, the detected position of the conveyor idler in the direction 29 depicted in FIGS. 1 and 2. In certain embodiments, the detected position of the conveyor idler in the direction 31 as depicted in FIGS. 1 and 2. In certain embodiments, the method 124 also includes receiving respective signals indicative of respective positions on both sides (i.e., each longitudinal end) of the conveyor idler. The method 124 also includes filtering, via a bandpass filter, the signal(s) at a chain slat frequency (e.g., frequency that a plurality of slats pass a detection location of the sensors) to generate a filtered signal (or filtered signals when respective signals are received for both ends of the conveyor idler) (block 128). In certain embodiments, the filtering may occur at a band around the frequency or individually at some margin above or below. In certain embodiments, the frequency of the slats may be 9.5 Hertz (Hz). In certain embodiments, a crop frequency may range from 0.2 to 1 Hz. Looking for the power at the crop frequency may enable identification of the crop. The method 124 further includes calculating a variation (in the amplitude) of the filtered signal(s) over time (block 130).

In certain embodiments, the method 124 includes providing controls signals to adjust one or more parameters of the header based solely on the variation of the position of the conveyor idler (e.g., variation in amplitude of the filtered signal) over time (block 132). In certain embodiments, the method 124 includes receiving one or more additional signals (block 134) and providing control signals to adjust one or more parameters of the header based on both the variation of the position of the conveyor idler and the one or more additional signals. In certain embodiments, the additional signal is representative of a net engine load. In certain embodiments, the method 124 includes calculating a recursive correlation between variation of the net engine load over time and the variation of the position of the conveyor idler over time (block 136) and providing control signals to adjust one or more parameters of the header and a ground speed of the harvester based on the recursive correlation. In certain embodiments, the additional signal is indicative of a distribution of the crop across a width of the conveyor, and the method 124 includes providing control signals to adjust one or more parameters of the header based on the variation of the position of the conveyor idler and the addition signal indicative of the crop distribution.

The parameters that may be adjusted include knife position, reel position, auger speed, and belt speeds of a draper. In certain embodiments, only a single parameter is adjusted at a time. In certain embodiments, more than one parameter is adjusted at a time. In certain embodiments, the one or more parameters are adjusted until the variation (e.g., in the amplitude of the filtered signal) is minimized. In certain embodiments, one or more parameters may be adjusted differently on different sides of the feeder (e.g., left draper belt speed versus right draper belt speed) to ensure a consistent crop flow with minimum variation in throughput and layer thickness across the width of the conveyor.

The method 124 also includes monitoring the variation in the filtered signal subsequent to adjusting the one or more parameters of the filtered signal (block 138). In particular, the variation is monitored to determine if it is less (block 140). If the variation is less, the method 124 includes further providing control signals to further adjust the same one or more parameters previously adjusted of the header to attempt to further minimize the variation (block 142). If the variation is not less, the method 124 includes providing control signals to change back the one or more parameters to a previous setting or to change the one or more parameters in an opposite direction (block 144). In either case, the variation is continuously monitored (block 138). In certain embodiments, the method 124 receives additional data (e.g., additional signals) (block 146) and utilizes the additional data in determining whether to provide control signals to further adjust the same one or more parameters previously adjusted (block 142) or to provide control signals to change back the one or more parameters to a previous setting or to change the one or more parameters in an opposite direction (block 144). The additional data includes one or more of a crop height, a crop density, and a humidity prior cutting or while cutting the crop.

Figure 6:
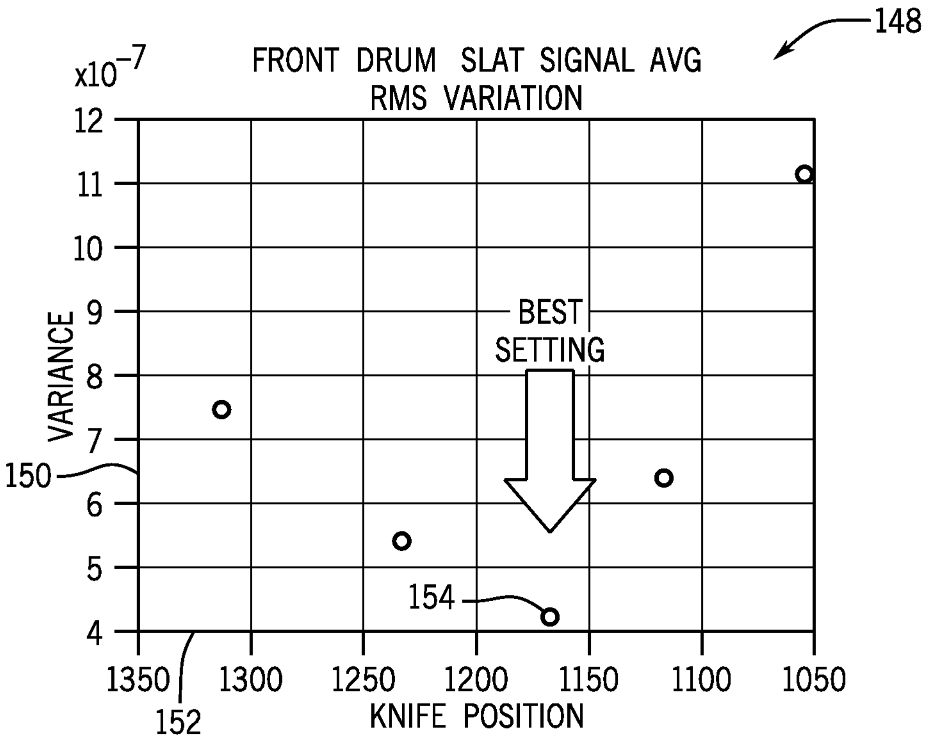
FIG. 6 is a graph illustrating variance at different settings of a parameter, in accordance with aspects of the present disclosure.

FIG. 6 is a graph 148 illustrating variance at different settings of a parameter. In particular, the graph 148 includes a Y-axis 150 representing variance or variation (e.g., in amplitude) in the filtered signal representative of the detection position of the conveyor idler (e.g., front feeder drum) in the direction 29 depicted in FIGS. 1 and 2. The filtered signal was obtained by bandpass filtering the signal obtained of the detected position of the front feeder in the direction 29 at the frequency that the plurality of slats pass a detection location of the one or more sensors. The graph 148 also include an X-axis 152 representative of a parameter (e.g., knife position). As shown on the graph 148, point 154 indicates the knife position where the variance is minimal (i.e., where the crop flow is optimal to have minimal variation in throughput and layer thickness).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for (perform)ing (a function) . . . ” or “step for (perform)ing (a function) . . . ”, it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural harvester, comprising:

a header for gathering a crop and feeding the crop into a feeder housing;

the feeder housing, comprising:

a conveyer, comprising a conveyor idler; and a system for automatically adjusting one or more parameters of the header, wherein the system comprises:

one or more sensors that detect a position of the conveyor idler over time; and a controller that receives a signal indicative of the position of the conveyor idler and provides one or more control signals to adjust the one or more parameters of the header based on a variation of the position of the conveyor idler over time.

2. The agricultural harvester of claim 1, wherein the variation of the position of the conveyor idler over time relates to movement of the conveyor idler in a direction perpendicular to a longitudinal axis of the conveyer.

3. The agricultural harvester of claim 1, wherein the variation of the position of the conveyor idler over time relates to movement of the conveyor idler in a direction parallel to a longitudinal axis of the conveyer.

4. The agricultural harvester of claim 3, wherein the conveyor idler comprises a first longitudinal end adjacent a first side of the feeder housing and a second longitudinal end adjacent a second side of the feeder housing and opposite the first longitudinal end;

wherein the one or more sensors detect both a first position of the conveyor idler over time at the first longitudinal end and a second position of the conveyor idler over time at the second longitudinal end; and wherein the controller receives both a first signal indicative of the first position and a second signal indicative of second position to derive differences across a width of the conveyor extending from the first side to the second side in feeding the crop into the feeder housing based on first signal and the second signal, and to provide the one or more control signals that adjusts the one or more parameters of the header across a width of the header based on the variation of both the first position and the second position of the conveyor idler over time.

5. The agricultural harvester of claim 4, wherein the conveyor comprises a plurality of chains disposed about the conveyor idler and a plurality of slats extending across at least two chains of the plurality of chains;

wherein the plurality of slats comprises a first set of slats disposed on the plurality of chains adjacent the first side, a second set of slats disposed on the plurality of chains adjacent the second side, and a third set of slats disposed on the plurality of chains between the first set of slats and the second set of slats; and wherein a first spacing of the first set of slats along the longitudinal axis differs from a second spacing of the second set of slats along the longitudinal axis and/or a third spacing of the third set of slats along the longitudinal axis to enable the differences across the width of the conveyor in feeding the crop into the feeder housing to be detected.

6. The agricultural harvester of claim 1, wherein the controller performs a bandpass filter of the signal at a frequency that a plurality of slats passes a detection location of the one or more sensors in generating a filtered signal.

7. The agricultural harvester of claim 6, wherein the controller provides the one or more control signals to adjust the one or more parameters of the header based on a variation over time of the filtered signal.

8. The agricultural harvester of claim 3, wherein the controller receives an additional signal indicative of net engine load to calculate a recursive correlation between variation of the net engine load over time and the variation of the position of the conveyor idler over time, and to adjust both the one or more parameters of the header and a ground speed of the agricultural harvester based on the recursive correlation.

9. The agricultural harvester of claim 3, wherein the controller receive one or more additional signals indicative of a distribution of the crop across a width of the conveyor, and adjusts the one or more parameters of the header based on both the variation of the position of the conveyor idler over time and the one or more additional signals.

10. The agricultural harvester of claim 1, wherein the controller receives additional data and provides the one or more control signals to adjust the one or more parameters of the header based on both the variation of the position of the conveyor idler over time and the additional data, wherein the additional data comprises crop height, crop density, and/or humidity prior to cutting or while cutting the crop.

11. The agricultural harvester of claim 1, wherein the controller adjusts the one or more parameters of the header until the variation is minimized.

12. The agricultural harvester of claim 1, wherein the one or more parameters comprises at least one of knife position, reel position, auger speed, and belt speeds of a draper.

13. A system of automatically adjusting one or more parameters of a header of an agricultural harvester in gathering a crop and feeding the crop into a feeder housing, comprising:

one or more sensors that detect a position of a conveyor idler of a conveyor of the feeder housing over time; and a controller that receives a signal indicative of the position of the conveyor idler and to provide one or more control signals to adjust the one or more parameters of the header based on a variation of the position of the conveyor idler over time.

14. The system of claim 13, wherein the variation of the position of the conveyor idler over time relates to movement of the conveyor idler in a direction parallel to a longitudinal axis of the conveyer.

15. The system of claim 14, wherein the controller performs a bandpass filter of the signal at a frequency that a plurality of slats disposed on a plurality of chains of the conveyor pass a detection location of the one or more sensors to generate a filtered signal.

16. The system of claim 15, wherein the controller provides the one or more control signals that adjusts the one or more parameters of the header based on a variation over time of the filtered signal.

17. A method of automatically adjusting one or more parameters of a header of an agricultural harvester in gathering a crop and feeding the crop into a feeder housing, comprising:

receiving, at a processor from one or more sensors, a signal indicative of a position of a conveyor idler of a conveyor of the feeder housing over time; and providing, via the processor, one or more control signals that adjust the one or more parameters of the header based on a variation of the position of the conveyor idler over time.

18. The method of claim 17, wherein the variation of the position of the conveyor idler over time relates to movement of the conveyor idler in a direction parallel to a longitudinal axis of the conveyer.

19. The method of claim 17, further comprising performing a bandpass filtering of the signal at a frequency that a plurality of slats disposed on a plurality of chains of the conveyor pass a detection location of the one or more sensors that generates a filtered signal.

20. The method of claim 19, wherein the providing the one or more control signals that adjust the one or more parameters of the header is based on a variation over time of the filtered signal.

* * * * *